No. 832,162. PATENTED OCT. 2, 1906.
Z. J. ROTHWELL & J. E. BLAISDELL.
HORSESHOE.
APPLICATION FILED APR. 9, 1906.
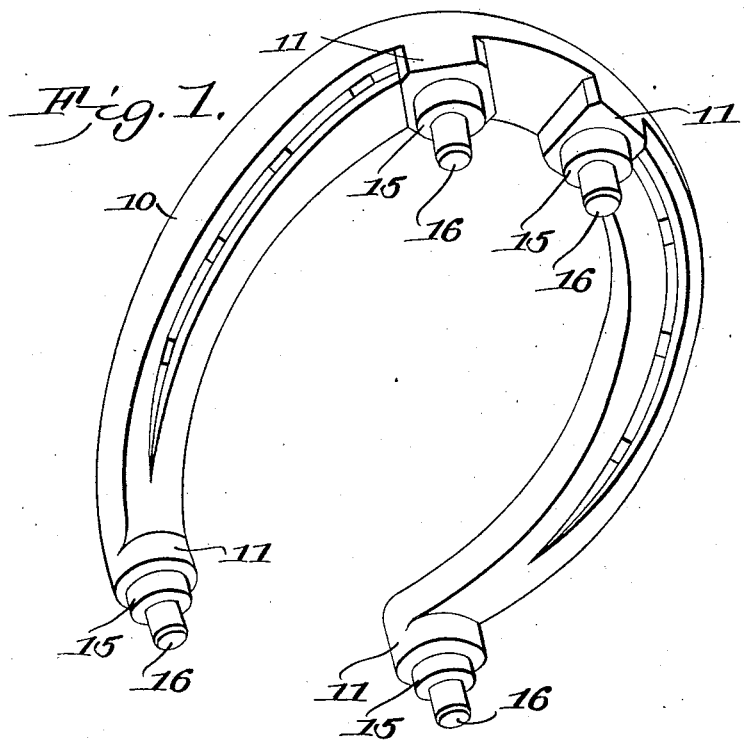
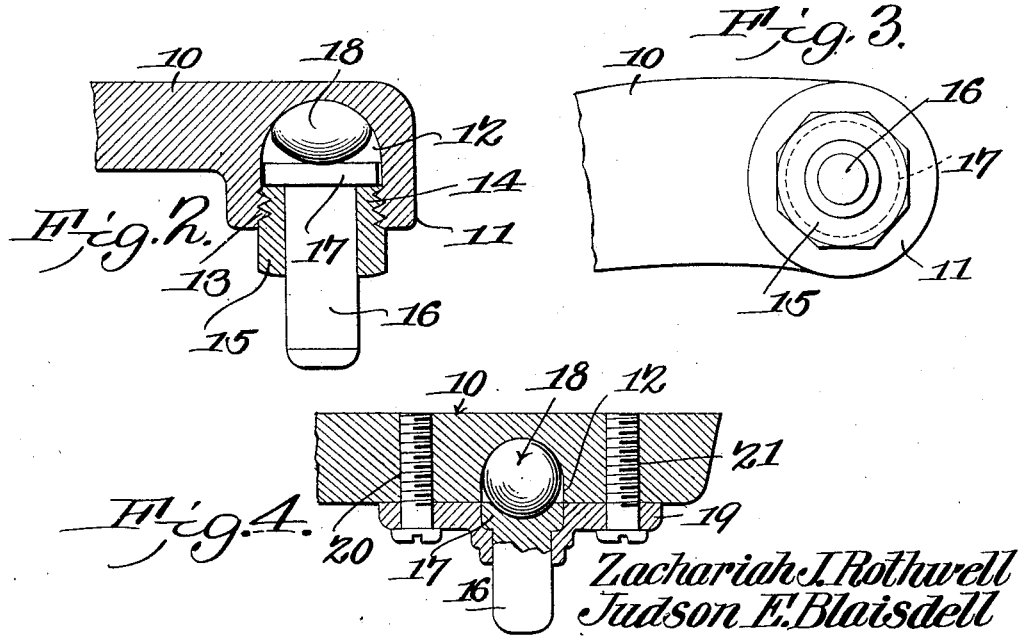
WITNESSES:
Zachariah J. Rothwell
Judson E. Blaisdell
INVENTORS
By C. A. Snow & Co.
ATTORNEYS

UNITED STATES PATENT OFFICE.

ZACHARIAH JOHN ROTHWELL AND JUDSON ELIAS BLAISDELL, OF SUPERIOR, WISCONSIN.

HORSESHOE.

No. 832,162.  Specification of Letters Patent.  Patented Oct. 2, 1906.

Application filed April 9, 1906. Serial No. 310,800.

*To all whom it may concern:*

Be it known that we, ZACHARIAH JOHN ROTHWELL and JUDSON ELIAS BLAISDELL, citizens of the United States, residing at Superior, in the county of Douglas and State of Wisconsin, have invented a new and useful Horseshoe, of which the following is a specification.

This invention relates to horseshoes and the calks for the same, and has for its object to provide a simply-constructed attachment to horseshoes whereby the calks are yieldably and detachably supported thereon.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a perspective view from beneath of a horseshoe with the calks attached thereto. Fig. 2 is a sectional view of a portion of a horseshoe and one of the improved calks. Fig. 3 is a bottom plan view of the portion shown in Fig. 2. Fig. 4 is a sectional view of a portion of a horseshoe and a modified construction of the improved calk connected thereto.

The improved device may be applied to any form or size of horseshoe, and in applying the improvement thereto the horseshoe 10 is enlarged, as shown at 11, where the calks are to be located, two of the calks being preferably located at the toe portion of the shoe. A cavity 12 is formed centrally of each of the enlargements 11 and the outer portions of the cavities internally threaded, as represented at 13, the cavities extending into the body of the shoe, with their inner ends rounded, as shown. Engaging the threaded cavities are externally-threaded tubular plugs 14, the plugs extending beyond the enlargements 11 to provide a gripping-surface 15 for an operating implement, such as a wrench, whereby the plugs may be inserted and removed, as required.

The calks represented at 16 are slidably disposed through the tubular plugs and with laterally-extending heads 17 at their inner ends bearing against the inner ends of the tubular plugs and with elastic elements 18, preferably of relatively hard rubber, within the cavities and against which the calks bear by their enlarged heads 17. By this means when pressure is imparted to the shoe the calks will yield slightly by the compression of the members 18, and thus produce a cushioning effect when the weight of the horse comes upon the shoe, thereby relieving the horse from the jars and shocks incident to the impact of the shoe with hard substances, especially when moving upon pavements or hard roads. The calk members 16 may be "sharp" or "dull" for winter or summer use, as may be required, and sharp calks may be quickly changed for dull calks or dull calks changed for sharp calks, as may be required, without removing the shoes from the hoofs by simply detaching the threaded plugs, as will be obvious.

In Fig. 4 a slight modification in the construction is shown, which may be employed under certain conditions, consisting in substituting for the threaded plug 14 a plate 19, having an aperture to receive the calk 16 and an internal shoulder to receive the laterally-extending head 17 of the calk, the plate 19 being secured to the shoe by spaced screws 20 21, the modified construction enabling the device to be readily adapted to horseshoes already manufactured or those constructed without the enlargement 11; but this modification would not be a departure from the principle of the invention, as the same results are produced in substantially the same manner.

Having thus described the invention, what is claimed as new is—

1. A horseshoe having recesses where the calks are located, apertured members having means for securing them to the shoe with their apertures bearing over said recesses, calks slidably disposed through said apertures with their inner ends provided with laterally-extending heads bearing against the apertured members, and elastic elements within said recesses and bearing upon said calks.

2. A horseshoe having internally-threaded recesses where the calks are located, threaded tubular members engaging said recesses, calks slidably disposed through said tubular members and provided with laterally-extending heads bearing against the inner ends of the same, and elastic elements within said recesses and engaged by said calks.

3. A horseshoe enlarged where the calks are located and with recesses in the enlarged portions, tubular members detachably secured in said recesses, calks slidable in said tubular members and with laterally-extending heads bearing against the inner ends of the same, and elastic elements within the recesses and engaged by the calks.

In testimony that we claim the foregoing as our own we have hereto affixed our signatures in the presence of two witnesses.

ZACHARIAH JOHN ROTHWELL,
JUDSON ELIAS BLAISDELL.

Witnesses:
CHARLES O. STENSRUD,
N. K. RASMUSSEN.